(12) United States Patent
Lu et al.

(10) Patent No.: US 11,515,572 B2
(45) Date of Patent: Nov. 29, 2022

(54) MOLECULAR CROWDING TYPE ELECTROLYTE AND BATTERY COMPRISING THE SAME

(71) Applicant: The Chinese University of Hong Kong, Hong Kong (CN)

(72) Inventors: Yi-Chun Lu, Hong Kong (CN); Jing Xie, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 275 days.

(21) Appl. No.: 16/798,136

(22) Filed: Feb. 21, 2020

(65) Prior Publication Data

US 2021/0265659 A1    Aug. 26, 2021

(51) Int. Cl.
| | | |
|---|---|---|
| *H01M 10/36* | (2010.01) | |
| *H01M 10/0565* | (2010.01) | |
| *H01M 10/0525* | (2010.01) | |
| *H01M 10/0569* | (2010.01) | |
| *H01M 4/58* | (2010.01) | |
| *H01M 4/131* | (2010.01) | |
| *H01M 4/134* | (2010.01) | |
| *H01M 4/38* | (2006.01) | |

(52) U.S. Cl.
CPC .......... *H01M 10/36* (2013.01); *H01M 4/131* (2013.01); *H01M 4/134* (2013.01); *H01M 4/382* (2013.01); *H01M 4/5815* (2013.01); *H01M 10/0525* (2013.01); *H01M 10/0565* (2013.01); *H01M 10/0569* (2013.01); *H01M 2300/0002* (2013.01); *H01M 2300/0085* (2013.01)

(58) Field of Classification Search
None
See application file for complete search history.

(56) References Cited

U.S. PATENT DOCUMENTS 4,002,490 A * 1/1977 Michalski ............... C09D 7/71
  252/181

FOREIGN PATENT DOCUMENTS

GB    2574494    * 12/2019

OTHER PUBLICATIONS

Yang et al., "4.0 V Aqueous Li-Ion Batteries," *Joule* 1:122-132, 2017. (25 pages).
Yang et al., "Aqueous Li-ion battery enabled by halogen conversion-intercalation chemistry in graphite," *Nature* 569:245-263, 2019.

* cited by examiner

*Primary Examiner* — Laura Weiner
(74) *Attorney, Agent, or Firm* — Seed IP Law Group LLP

(57) ABSTRACT

The disclosure relates to a molecular crowding type electrolyte that comprises at least one type of water-miscible/soluble polymer which acts as molecular crowding agent, a salt and a water. The disclosure also relates to a battery comprising the molecular crowding type electrolyte, and a method of using the molecular crowding electrolyte in electrochemical system such as battery that comprises an anode, a cathode and the molecular crowding type electrolyte.

18 Claims, 7 Drawing Sheets

MOLECULAR CROWDING TYPE ELECTROLYTE AND BATTERY COMPRISING THE SAME

TECHNICAL FIELD

The disclosure relates to a molecular crowding type electrolyte that comprises a water-miscible or water-soluble polymer which acts as molecular crowding agent, a salt and a water. The disclosure also relates to a battery comprising the molecular crowding type electrolyte and a method of using the molecular crowding electrolyte in electrochemical system such as battery.

BACKGROUND

Nonaqueous Li-ion batteries are the dominant energy storage technologies for electronic devices and electric vehicles owing to their high energy density (250-400 Wh/kg) and stable cycle life. However, potential safety hazard associated with flammable electrolytes used in nonaqueous Li-ion batteries have raised serious safety concerns. Replacing flammable nonaqueous electrolytes with non-flammable aqueous electrolytes is an effective approach to alleviate the safety concerns of the nonaqueous Li-ion batteries and reduce materials and manufacturing costs. Moreover, the voltage window of an aqueous Li-ion battery is limited by the electrochemical stability of water, which limits the energy density of the aqueous Li-ion batteries.

Recently, "water-in-salt" (WIS) electrolytes have been proposed as a new approach to expand the voltage window of the aqueous Li-ion batteries using highly concentrated salts. For instance, 21 m (molality, mol/kg) lithium bis(trifluoromethane) sulfonimide (LiTFSI) aqueous electrolyte was first reported as NIS electrolyte for $Mo_6S_8$/$LiMn_2O_4$ full battery with an operational voltage of 2.3 V, which is resulted from the decrease in the amount of free water molecules in WIS and the formation of solid electrolyte interphase (SET) created by anion reduction on the negative electrode. To break through the saturation limitation of LiTFSI, hydrated salts such as lithium trifluoro methane sulfonate (LiOTf), lithium bis(pentafluoroethanesulfonyl)imide (LiBETI) and lithium (trifluoromethanesulfonyl) (pentafluoroethanesulfonyl) imide (LiPTFSI) have been introduced to form "water in bi-salt" (21 m LiTFSI-7m LiOTf) for 2.5 V $TiO_2$/$LiMn_2O_4$ battery, hydrate-melt (19.4 m LiTFSI-8.3 m LiBETI) for 3.4 V $Li_4Ti_5O_{12}$/$LiNi_{0.5}Mn_{1.5}O_4$ battery, and monohydrate melt (22.2 m LiTFSI-33.3 m LiPTFSI), respectively.

Based on such fluorinated salt rich aqueous electrolytes, various modifications are subsequently adopted to improve the WIS system, for instance, adding tris(trimethylsilyl) borate (TMSB) into 21 m LiTFSI as interphase-forming additive to stabilize high voltage $LiCoO_2$ cathode for 2.5 V $Mo_6S_8$/$LiCoO_2$; reducing pH of 21 m LiTFSI to increase the discharge capacity of $LiNi_{0.5}Mn_{1.5}O_4$ in 3.0 V $Mo_6S_8$/$LiNi_{0.5}Mn_{1.5}O_4$ battery; and introducing non-aqueous solvent dimethyl carbonate (DMC) to 21 m LiTFSI for 3.5 V $Li_4Ti_5O_{12}$/$LiNi_{0.5}Mn_{1.5}O_4$, etc. In addition, to overcome cathodic stability limitation of WIS, a fluorinated interphase is pre-coated on graphite/lithium to build 4.0 V aqueous Li-ion batteries with WIS hydrogel. Based on this coating method, the protected graphite is coupled with a halogen intercalated graphite compound to achieve an energy density of 460 Wh $kg^{-1}$, which is already competitive with the state-of-the-art non-aqueous lithium-ion batteries.

However, the use of highly-concentrated fluorinated lithium salts leads to cost and toxicity concerns. To address these issues, concentrated mixed cation acetate "water-in-salt" electrolyte (32 m potassium acetate (KAc)-8 m lithium acetate (LiAc)) and "water-in-ionomer" gel (50% lithiated polyacrylic acid (LiPAA)-50% $H_2O$) have been proposed to replace the fluorinated salt rich electrolyte. However, owing to the absence of reliable SEI in 32 m KAc-8 m LiAc and the high water content needed (>30%) in LiPAA gel) avoid high rigidity and electrode-electrolyte contact issues, the water stability window is narrow in these non-fluorinated electrolytes, leading to lower energy density and shorter cycle life compared with fluorinated salt (e.g. hydrate melt).

In view of the above, there is also a need to develop low-cost and eco-friendly aqueous electrolytes with a wide voltage-window to achieve safe, high energy and sustainable aqueous batteries.

SUMMARY

In an aspect, the disclosure provides an electrolyte comprising a molecular crowding agent, a salt and a water, wherein the molecular crowding agent is a water-miscible or water-soluble polymer selected from the group consisting of poly(ethylene glycol), poly(propylene glycol), polyethylenimine, poly(acrylic acid), polyvinylpyrrolidone, polyvinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof.

In one embodiment, a weight ratio of the molecular crowding agent is from 65~98% based on the total weight of the molecular crowding agent and the water. In another embodiment, the weight ratio of the molecular crowding agent is from 70~95% based on the total weight of the molecular crowding agent and the water.

In one embodiment, the molecular crowding agent has a number-average molecular weight of 100 to 1000. In another embodiment, the molecular crowding agent is poly(ethylene glycol) with a number-average molecular weight of 400.

In some embodiments, the salt comprises a metal ion selected from the group consisting of $Li^+$, $Na^+$, $K^+$, $Mg^{2+}$ and $Al^{3+}$. In some embodiments, the salt comprises an anion selected from the group consisting of bis(trifluoromethanesulfonyl)imide (TFSI), trifluoromethane sulfonate (TF), bis(fluorosulfonyl)imide (FSI), bis(pentafluoroethane sulfonyl) imide (BETI), 4,5-dicyano-2-(trifluoromethyl)imidazole (TDI), fluoro(nonafluorobutane) (FNF), perchlorate ($ClO_4$), nitrate ($NO_3$) and sulfate ($SO_4$).

In some embodiments, the salt is selected from the group consisting of LiTFSI, LiTF, LiFSI, LiBETI, LiTDI, LiFNF, $LiClO_4$, $LiNO_3$, $Li_2SO_4$, NaTFSI, NaTF, NaFSI, NaBETI, NaTDI, NaFNF, $NaClO_4$, $NaNO_3$, $Na_2SO_4$, KTFSI, KTF, KFSI, KBETI, KFNF, $KClO_4$, $KNO_3$, $K_2SO_4$, $Mg(TFSI)_2$, $Mg(TF)_2$, $Mg(FSI)_2$, $Mg(BETI)_2$, $Mg(TDI)_2$, $Mg(FNF)_2$, $Mg(ClO_4)_2$, $Mg(NO_3)_2$, $MgSO_4$, $Al(TFSI)_3$, $Al(TF)_3$, $Al(FSI)_3$, $Al(BETI)_3$, $Al(TDI)_3$, $Al(FNF)_3$, $Al(ClO_4)_3$, $Al(NO_3)_3$, $Al_2(SO_4)_3$.

In one embodiment, the salt has a concentration of 1 m to 5 m based on the total weight of the electrolyte.

In another aspect, the disclosure provides a battery comprising an anode, a cathode and an electrolyte, wherein the electrolyte comprises a molecular crowding agent, a salt and a water, and wherein the molecular crowding agent is a water-miscible or water-soluble polymer selected from the group consisting of poly(ethylene glycol), polypropylene glycol), polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof.

In one embodiment, a weight ratio of the molecular crowding agent is from 65~98% based on the total weight of the molecular crowding agent and the water. In another embodiment, the weight ratio of the molecular crowding agent is from 70~95% based on the total weight of the molecular crowding agent and the water.

In one embodiment, the molecular crowding agent has a number-average molecular weight of 100 to 1000. In another embodiment, the molecular crowding agent is poly(ethylene glycol) with a number-average molecular weight of 400.

In one embodiment, the salt is a metal ion-containing salt which can release metal ions including at least one of $Li^+$, $Na^+$, $K^+$, $Mg^{2+}$, and $Al^{3+}$. In another embodiment, the salt is selected from the group consisting of LiTFSI, LiTF, LiFSI, LiBETI, LiTDI, LiFNF, $LiClO_4$, $LiNO_3$, $Li_2SO_4$, NaTFSI, NaTF, NaFSI, NaBETI, NaTDI, NaFNF, $NaClO_4$, $NaNO_3$, $Na_2SO_4$, KTFSI, KTF, KFSI, KBETI, KTDI, KFNF, $KClO_4$, $KNO_3$, $K_2SO_4$, $Mg(TFSI)_2$, $Mg(TF)_2$, $Mg(FSI)_2$, $Mg(BETI)_2$, $Mg(TDI)_2$, $Mg(FNF)_2$, $Mg(ClO_4)_2$, $Mg(NO_3)_2$, $MgSO_4$, $Al(TFSI)_3$, $Al(TF)_3$, $Al(FSI)_3$, $Al(BETI)_3$, $Al(TDI)_3$, $Al(FNF)_3$, $Al(ClO_4)_3$, $Al(NO_3)_3$, $Al_2(SO_4)_3$. In yet another embodiment, the salt has a concentration of 1 m to 5 m based on the total weight of the electrolyte.

In some embodiments, the battery comprises a cathode selected from the group consisting of $LiMn_2O_4$, $LiCoO_2$, $LiNi_{0.33}Mn_{0.33}Co_{0.33}O_2$, $LiNi_{0.5}Mn_{1.5}O_2$, $LiCoPO_4$, $LiNiPO_4$ (for Li-ion battery); $Na_4Fe(CN)_6$, $Na_2Fe_2(SO_4)_3$, $Na_3V_2(PO_4)_2F_3$, $Na_2MnP_2O_7$, $Na_4V_4(P_2O_7)_4(PO_4)$, $Na_{1.5}VPO_{4.8}F_{0.7}$, $Na_4Ni_{0.3}Co_{0.24}Mn_{0.3}(PO_4)_2(P_2O_7)$, $Na_{2/3}(Ni_{1/3}Mn_{2/2})O_2$, $Na(Li_{0.05}(Ni_{0.25}Fe_{0.25}Mn_{0.5})_{0.95})O_2$, $Na_x(Fe_{1/2}Mn_{1/2})O_2$, $Na_4Fe_2(CN)_6$ (for Na-ion battery); $KVPO_4F$, KNiFe(CN), $FeSO_4F$, $KMnFe(CN)_6$, $K_3V_2(PO_4)_3$ (for K-ion battery); CuHCF, NiHCF, $RuO_2$, Birnessite $MnO_2$, $V_2O_5$ (for Mg-ion battery); $V_2O_5$, $VO_2$, $TiO_2$, $MoO_2$, $FeS_2$, $Mo_6S_8$, $SnS_2$, NiS, CuS, graphite, amorphous carbons (for Al-ion battery).

In some embodiments, the battery comprises an anode selected from the group consisting of $Li_4Ti_5O_{12}$, $TiO_2$, graphite, S, Sn/Si-based alloys, Li (for Li-ion battery); $NaTiO_2$, $Na_2Ti_3O_7$, $TiO_2$, $Li_4Ti_5O_{12}$, $Na_2C_8H_4O_4$, $Na_2C_{10}H_2O_4$, $Na_4Ti_5O_{12}$, $MoS_2$, $Co_3O_4$, $Fe_3O_4$, Sn, SnSb, ZnS, hard carbon, $Sn_xP_3$, $Cu_xO$, $SnS_x$, Graphene (for Na-ion battery); $MoS_2$, PAQS, $K_2TP$, $Co_3O_4$—$Fe_2O_3$, Graphite, $K_2Ti_4O_{17}$ (for K-ion battery); Mg, $Li_4Ti_5O_{12}$, $\alpha$-$MnO_2$, $Mg_xMo_3S_4$, $TiS_2$, $WSe_2$ (for Mg-ion battery); Graphite, Al (for Al-ion battery).

The molecular crowding aqueous electrolyte of the present disclosure has an extended voltage window of aqueous electrolyte via confining water molecules in a crowding agent which is specific water-miscible/soluble polymer, and further achieves lower cost, better safety and excellent eco-friendly, as compared to the existing WIS electrolyte.

In yet another aspect, the disclosure provides a method for manufacturing a battery, comprising providing an anode and a cathode; preparing an electrolyte from a salt, a water and a molecular crowding agent, wherein the molecular crowding agent is a water-miscible or water-soluble polymer selected from the group consisting of poly(ethylene glycol), poly(propylene glycol), polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof; assembling the anode and the cathode with the electrolyte, thereby obtaining the battery.

In one embodiment, a weight ratio of the molecular crowding agent is from 65~98% based on the total weight of the molecular crowding agent and the water. In another embodiment, the weight ratio of the molecular crowding agent is from 70~95% based on the total weight of the molecular crowding agent and the water.

In one embodiment, the molecular crowding agent has a number-average molecular weight of 100 to 1000. In another embodiment, the molecular crowding agent is poly(ethylene glycol) with a number-average molecular weight of 400.

In one embodiment, the salt is a metal ion-containing salt which can release metal ions including at least one of $Li^+$, $Na^+$, $K^+$, $Mg^{2+}$, and $Al^{3+}$. In another embodiment, the salt is selected from the group consisting of LiTFSI, LiTF, LiFSI, LiBETI, LiTDI, LiFNF, $LiClO_4$, $LiNO_3$, $Li_2SO_4$, NaTFSI, NaTF, NaFSI, NaBETI, NaTDI, NaFNF, $NaClO_4$, $NaNO_3$, $Na_2SO_4$, KTFSI, KTF, KFSI, KBETI, KTDI, KFNF, $KClO_4$, $KNO_3$, $K_2SO_4$, $Mg(TFSI)_2$, $Mg(TF)_2$, $Mg(FSI)_2$, $Mg(BETI)_2$, $Mg(TDI)_2$, $Mg(FNF)_2$, $Mg(ClO_4)_2$, $Mg(NO_3)_2$, $MgSO_4$, $Al(TFSI)_3$, $Al(TF)_3$, $Al(FSI)_3$, $Al(BETI)_3$, $Al(TDI)_3$, $Al(FNF)_3$, $Al(ClO_4)_3$, $Al(NO_3)_3$, $Al_2(SO_4)_3$. In yet another embodiment, the salt has a concentration of 1 m to 5 m based on the total weight of the electrolyte.

In some embodiments, the battery comprises a cathode selected from the group consisting of $LiMn_2O_4$, $LiCoO_2$, $LiNi_{0.33}Mn_{0.33}Co_{0.33}O_2$, $LiNi_{0.5}Mn_{1.5}O_2$, $LiCoPO_4$, $LiNiPO_4$ (for Li-ion battery); $Na_4Fe(CN)_6$, $Na_2Fe_2(SO_4)_3$, $Na_3V_2(PO_4)_2F_3$, $Na_2MnP_2O_7$, $Na_4V_4(P_2O_7)_4(PO_4)$, $Na_{1.5}VPO_{4.8}F_{0.7}$, $Na_4Ni_{0.3}Co_{0.24}Mn_{0.3}(PO_4)_2(P_2O_7)$, $Na_{2/3}(Ni_{1/3}Mn_{2/2})O_2$, $Na(Li_{0.05}(Ni_{0.25}Fe_{0.25}Mn_{0.5})_{0.95})O_2$, $Na_x(Fe_{1/2}Mn_{1/2})O_2$, $Na_4Fe_2(CN)_6$ (for Na-ion battery); $KVPO_4F$, KNiFe(CN), $FeSO_4F$, $KMnFe(CN)_6$, $K_3V_2(PO_4)_3$ (for K-ion battery); CuHCF, NiHCF, $RuO_2$, Birnessite $MnO_2$, $V_2O_5$ (for Mg-ion battery); $V_2O_5$, $VO_2$, $TiO_2$, $MoO_2$, $FeS_2$, $Mo_6S_8$, $SnS_2$, NiS, CuS, graphite, amorphous carbons (for Al-ion battery).

In some embodiments, the battery comprises an anode selected from the group consisting of $Li_4Ti_5O_{12}$, $TiO_2$, graphite, S, Sn/Si-based alloys, Li (for Li-ion battery); $NaTiO_2$, $Na_2Ti_3O_7$, $TiO_2$, $Li_4Ti_5O_{12}$, $Na_2C_8H_4O_4$, $Na_2C_{10}H_2O_4$, $Na_4Ti_5O_{12}$, $MoS_2$, $Co_3O_4$, $Fe_3O_4$, Sn, SnSb, ZnS, hard carbon, $Sn_xP_3$, $Cu_xO$, $SnS_x$, Graphene (for Na-ion battery); $MoS_2$, polyanthraquinone sulfide(PAQS), dipotassium terephthalate($K_2TP$), $Co_3O_4$—$Fe_2O_3$, Graphite, $K_2Ti_4O_{17}$ (for K-ion battery); Mg, $Li_4Ti_5O_{12}$, $\alpha$-$MnO_2$, $Mg_xMo_3S_4$, $TiS_2$, $WSe_2$ (for Mg-ion battery); Graphite, Al (for Al-ion battery).

The molecular crowding aqueous electrolyte of the present disclosure has an extended voltage window of aqueous electrolyte via confining water molecules in a crowding agent which is specific water-miscible/soluble polymer, and further achieves lower cost, better safety and excellent eco-friendly, as compared to the existing WIS electrolyte.

DESCRIPTION OF DRAWINGS

Embodiments illustrated herein are further described in the following description in conjunction with the accompanying drawings. However, the accompanying drawings are only provided to enable those skilled in the art to better understand the disclosure, rather than limit the scope of the disclosure.

DETAILED DESCRIPTION

Figure 1:
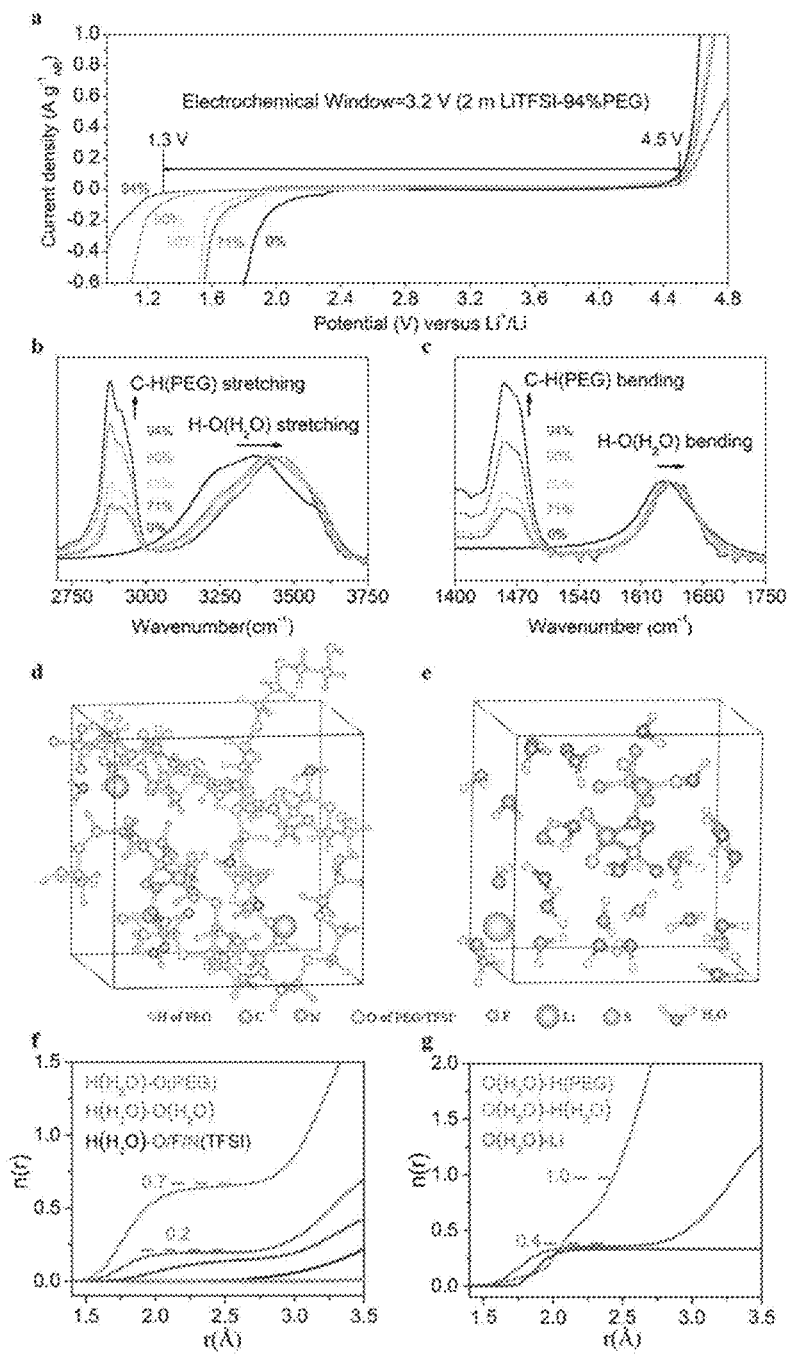
FIG. 1 illustrates the electrochemical stability window and the structure of molecular crowding electrolytes, wherein (a) shows electrochemical stability windows for 2 m LiTFSI-xPEG-(1-x)$H_2O$ (x=0, 71, 80, 90, 94%) determined by liner sweep voltammetry tests on AB coated aluminum foil at a scan rate of 0.2 mV/s; (b-c) show normalized FTIR of a series of 2 m LiTFSI-x PEG-(1-x) $H_2O$ electrolytes; (d-e) show snapshots of 2 m LiTFSI-94% PEG-6% $H_2O$ and 2 m LiTFSI-$H_2O$ electrolyte during MD simulations. (f-g) show the running $H(H_2O)$ and $O(H_2O)$ coordination numbers in 2 m LiTFSI-94% PEG-6% $H_2O$ electrolyte, and wherein the coordination number is obtained from pair distribution function integral during MD simulations, and in order to show the hydrogen bond structure more intuitively, the coordination numbers for the covalence shell have been subtracted.

The disclosure will be further illustrated by the following specific embodiments. However, the specific embodiments are listed for illustrative purposes only, and not intended to limit the disclosure. As will be appreciated by those skilled in the art, specific feature(s) according to any one of the following embodiments may be used in any other embodiments without deviating from the spirit of the disclosure.

The electrolyte of the disclosure may comprise at least one type of molecular crowding agent, a salt and a water, wherein the molecular crowding agent is water-miscible polyethylene glycol) or a water-miscible/soluble polymer selected from the group consisting of poly(propylene glycol), polyethylenimine, poly(acrylic acid), polyvinylpyrrolidone, polyvinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer or a derivative thereof. Molecular crowding is a common phenomenon in living cells where water activity is significantly suppressed by molecular crowding agents through altering hydrogen-bonding structure. As a consequence of crowded environments, the activity of the water solvent is reduced owing to the changes in the water hydrogen-bonding structuring. Inspired by this phenomenon in living cells, the inventors have designed and demonstrated that a molecular-crowding type electrolyte using water-miscible/soluble polymer such as polyethylene glycol) or its derivatives as the crowding agent could reduce water activity for suppressing water decomposition in aqueous batteries, thereby achieving a wide electrolyte operation window with low salt-concentration. This work provides a new path for designing high voltage aqueous electrolytes for low cost and sustainable energy storage.

In one embodiment, the weight ratio of the molecular crowding agent may be from 65~98% based on the total weight of the molecular crowding agent and the water. In another embodiment, the weight ratio of the molecular crowding agent may be from 70~95% based on the total weight of the molecular crowding agent and the water. In yet another embodiment, based on the total weight of the molecular crowding agent and the water, the weight ratio of the molecular crowding agent may be 65%, 70%, 75%, 80%, 85%, 90%, or 95%, or any value within the above ranges.

In one embodiment, the molecular crowding agent has a number-average molecular weight of 100 to 1000, such as 150, 200, 250, 300, 350, 400, 450, 500, 550, 600, 650, 700, 750, 800, 850, 900, 950 or any value within the range. In another embodiment, the molecular crowding agent is polyethylene glycol) with a number-average molecular weight of 400. In order to render the battery non-toxic and low cost properties, liquid poly(ethylene glycol) may be used as the crowding agent. For example, liquid polyethylene glycol) 400 (PEG 400, $HO(CH_2CH_2O)_nH$, Mn=400) can be used as the crowding agent for its unique water-miscible, non-toxic, inert and low-cost features (e.g., 30-100 times cheaper than LiTFSI, see table 3 below). Furthermore, the molecular crowding type aqueous electrolyte of the disclosure could achieve a high operational cell voltage via confining water molecules in the crowding agent network through hydrogen bonding.

In one embodiment, the salt is selected from the group consisting of LiTFSI, LiTF, LiFSI, LiBETI, LiTDI, LiFNF, $LiClO_4$, $LiNO_3$, $Li_2SO_4$, NaTFSI, NaTF, NaFSI, NaBETI, NaTDI, NaFNF, $NaClO_4$, $NaNO_3$, $Na_2SO_4$, KTFSI, KTF, KFSI, KBETI, KTDI, KFNF, $KClO_4$, $KNO_3$, $K_2SO_4$, $Mg(TFSI)_2$, $Mg(TF)_2$, $Mg(FSI)_2$, $Mg(BETI)_2$, $Mg(TDI)_2$, $Mg(FNF)_2$, $Mg(ClO_4)_2$, $Mg(NO_3)_2$, $MgSO_4$, $Al(TFSI)_3$, $Al(TF)_3$, $Al(FSI)_3$, $Al(BETI)_3$, $Al(TDI)_3$, $Al(FNF)_3$, $Al(ClO_4)_3$, $Al(NO_3)_3$, $Al_2(SO_4)_3$. In yet another embodiment, the salt may have a concentration of 1 m (molality, mol/kg) to 5 m based on the total weight of the electrolyte. In further embodiment, based on the total weight of the electrolyte, the concentration of the salt may be 1.5 m, 2 m, 2.5, 3 m, 3.5 m, 4.5 m, or any value within the above range. While the salt contained in the electrolyte is Li salt, PEG has a strong $Li^+$ solvating ability, leading to facile dissolution of Li salt (e.g. LiTFSI) in the PEG-$H_2O$ solvent.

Figure 7:
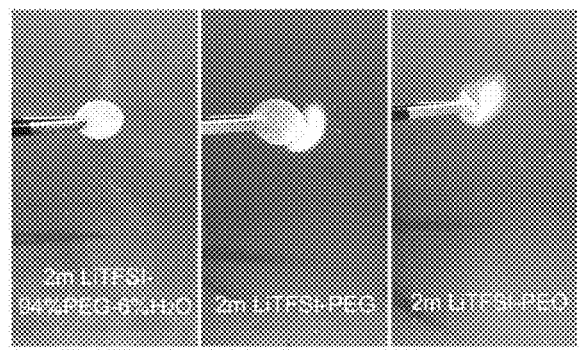
FIG. 7 illustrates the snapshot of flammability testing of 2 m LiTFSI-94% PEG-6% $H_2O$, 2 m LiTFSI-PEG and 2 m LiTFSI-PEO. The snapshot shows the picture of glass fiber soaked with 2 m LiTFSI-94% PEG-6% $H_2O$, 2 m LiTFSI-PEG and the film of 2 m LiTFSI-PEO after treated with propane flame.
Figure 8:
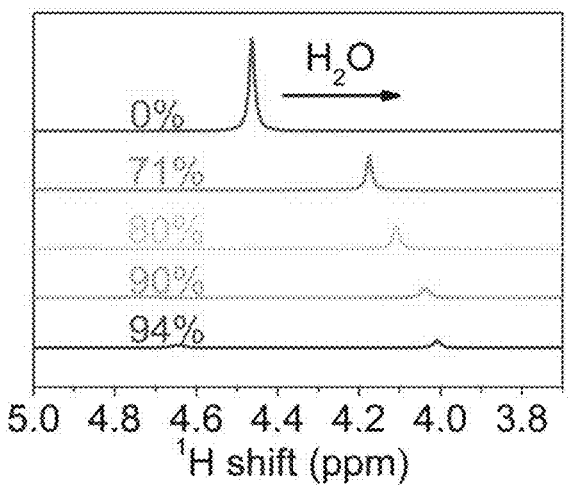
FIG. 8 illustrates $^1$H-NMR spectra of a series of 2 m LiTFSI-xPEG-(1-x)$H_2O$ (x=0%, 71%, 80%, 90%, 94%), wherein the decreased $^1$H shift of $H_2O$ upon PEG addition indicates the increased electron density around the H atom owing to the formation of hydrogen bond between water and PEG.

For example, PEG400, as the molecular crowding agent, is used to investigate how the molecular crowding agent modifies the stability of $H_2O$ in an aqueous electrolyte by nuclear magnetic resonance spectroscopy (NMR), Fourier-transform infrared spectroscopy (FTIR) and theoretical calculation to reveal the molecular interactions between the molecular crowding agent and $H_2O$. As shown in $^1$H-NMR spectra of 2 m LiTFSI-xPEG-(1-x)$H_2O$ electrolytes (x=0, 71, 80, 90, 94%) of FIG. 7, $^1$H shift of $H_2O$ is decreased with increasing PEG content, indicating higher electron density around the H atom with increasing PEG content (more shielding). This can be attributed to the hydrogen bonding interaction between the O atom of PEG and the H atom in $H_2O$.

FIGS. 1b and 1c illustrate FTIR spectra of a series of 2 m LiTFSI-xPEG-(1-x)$H_2O$ electrolytes. The typical mode of H—O stretching (3200 $cm^{-1}$-3400 $cm^{-1}$) and bending (1638 $cm^{-1}$) of $H_2O$ in 2 m LiTFSI shift to higher wavenumbers upon the addition of PEG (i.e. to 3480 $cm^{-1}$ and 1648 $cm^{-1}$ respectively in 2 m LiTFSI-94% PEG). This blue shift in the H—O covalent bond oscillation can be attributed to the perturbation of water hydrogen bond network by water-PEG interactions. The ethereal oxygen atom in PEG has higher negative charge density than the oxygen atom in water owing to the inductive donating effect of alkyl groups in PEG, which reduces the tendency of oxygen atom (PEG) to attract electrons and weakens the hydrogen bonding between water-PEG compared with that between water-water, leading to the strengthening of H—O covalent bond and blue shift of water molecule. The higher wavenumber of light absorbed by the H—O bond of the water indicates that the H—O covalent bond strength is increased, which explains the significantly increased electrochemical stability i.e. higher overpotential is needed to electrochemically decompose water in the presence of crowding agent PEG.

In order to study the structure of the molecular crowding type aqueous electrolyte, first principle density functional theory (DFT)-molecular dynamic (MD) simulation is performed for 2 m LiTFSI-$H_2O$ and 2 m LiTFSI-94% PEG-6% $H_2O$. The snapshots of equilibrium trajectories (see FIGS. 1d and 1e) shows that negligible free water molecules exist in 2 m LiTFSI-94% PEG-6% $H_2O$ owing to PEG crowding compared to 2 m LiTFSI-$H_2O$. To further gain insight into the coordination environment of water molecules in the molecular crowding type electrolytes, the running H($H_2O$) and O($H_2O$) coordination numbers in 2 m LiTFSI-94% PEG-6% $H_2O$ are obtained from pair distribution function integral during MD simulations. FIG. 1f shows that each H atom of $H_2O$ consists of approximately 0.7 O(PEG), 0.2 O($H_2O$) and 0.1 N/O/F(TFSI) in the shell with a radius ranging from 2.2 Å to 2.5 Å, which is categorized as the distance of "strong, mostly covalent" hydrogen bond. FIG. 1g shows that the O atom of $H_2O$ is hydrogen bonded to around 1.0 H(PEG), 0.4 H($H_2O$) and solvated with 0.4 $Li^+$, which is different from the traditional dilute aqueous electrolyte which consists of abundant water-water hydrogen bonds (see FIG. 9) and typical WIS electrolytes where water molecules are mainly solvated with ions. The DFT-MD simulation results reveal the unique structure of the molecular crowding type electrolytes and show that water molecules are hydrogen-bonded to PEG, which is consistent with the resulted strengthened H—O covalent bond in water observed in NMR and FT-IR measurements.

On the basis of the above surprising finding, a high-energy-density battery can be constructed. In one embodiment, the battery comprises an anode, a cathode and an electrolyte, wherein the electrolyte comprises a molecular crowding agent (for example, one, two, three or more molecular crowding agents), a salt and a water, and wherein the molecular crowding agent is water-miscible poly(ethylene glycol) or a water-miscible/soluble polymer selected from the group consisting of polypropylene glycol, polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer or a derivative thereof. In practice, the battery can further comprise any common elements used in electrochemical system, for example, separator such as polymeric separator. In other embodiment, the weight ratio of the molecular crowding agent in the battery may be from 65~98% based on the total weight of the molecular crowding agent and the water in the battery. In another embodiment, the weight ratio of the molecular crowding agent in the battery may be from 70~95% based on the total weight of the molecular crowding agent and the water in the battery. In yet another embodiment, based on the total weight of the molecular crowding agent and the water in the battery, the weight ratio of the molecular crowding agent in the battery may be 65%, 70%, 75%, 80%, 85%, 90%, or 95%, or any value within the above ranges.

In one embodiment, the molecular crowding agent used in the battery has a number-average molecular weight of 100 to 1000, such as 150, 200, 250, 300, 350, 400, 450, 500, 550, 600, 650, 700, 750, 800, 850, 900, 950 or any value within the range. In another embodiment, the molecular crowding agent is poly(ethylene glycol) with a number-average molecular weight of 400. In one embodiment, the salt is selected from the group consisting of LiTFSI, LiTF, LiFSI, LiBETI, LiTDI, LiFNF, LiClO$_4$, LiNO$_3$, Li$_2$SO$_4$, NaTFSI, NaTF, NaFSI, NaBETI, NaTDI, NaFNF, NaClO$_4$, NaNO$_3$, Na$_2$SO$_4$, KTFSI, KTF, KFSI, KBETI, KTDI, KFNF, KClO$_4$, KNO$_3$, K$_2$SO$_4$, Mg(TFSI)$_2$, Mg(TF)$_2$, Mg(FSI)$_2$, Mg(BETI)$_2$, Mg(TDI)$_2$, Mg(FNF)$_2$, Mg(ClO$_4$)$_2$, Mg(NO$_3$)$_2$, MgSO$_4$, Al(TFSI)$_3$, Al(TF)$_3$, Al(FSI)$_3$, Al(BETI)$_3$, Al(TDI)$_3$, Al(FNF)$_3$, Al(ClO$_4$)$_3$, Al(NO$_3$)$_3$, Al$_2$(SO$_4$)$_3$. In yet another embodiment, the salt used in the battery may have a concentration of 1 m (molality, mol/kg) to 5 m based on the total weight of the electrolyte. In further embodiment, based on the total weight of the electrolyte used in the battery, the concentration of the salt may be 1.5 m, 2 m, 2.5, 3 m, 3.5 m, 4.5 m, or any value within the above range.

In some embodiments, the battery comprises a cathode selected from the group consisting of LiMn$_2$O$_4$, LiCoO$_2$, LiNi$_{0.33}$Mn$_{0.33}$Co$_{0.33}$O$_2$, LiNi$_{0.5}$Mn$_{1.5}$O$_2$, LiCoPO$_4$, LiNiPO$_4$ (for Li-ion battery); Na$_4$Fe(CN)$_6$, Na$_2$Fe$_2$(SO$_4$)$_3$, Na$_3$V$_2$(PO$_4$)$_2$F$_3$, Na$_2$MnP$_2$O$_7$, Na$_4$V$_4$ (P$_2$O$_7$)$_4$(PO$_4$), Na$_{1.5}$VPO$_{4.8}$F$_{0.7}$, Na$_4$Ni$_{0.3}$Co$_{0.24}$Mn$_{0.3}$(PO$_4$)$_2$(P$_2$O$_7$), Na$_{2/3}$(Ni$_{1/3}$Mn$_{2/2}$)O$_2$, Na(Li$_{0.05}$(Ni$_{0.25}$Fe$_{0.25}$Mn$_{0.5}$)$_{0.95}$)O$_2$, Na$_x$(Fe$_{1/2}$Mn$_{1/2}$)O$_2$, Na$_4$Fe$_2$(CN)$_6$ (for Na-ion battery); KVPO$_4$F, KNiFe(CN) FeSO$_4$F, KMnFe(CN)$_6$, K$_3$V$_2$(PO$_4$)$_3$ (for K-ion battery); CuHCF, NiHCF, RuO$_2$, Birnessite MnO$_2$, V$_2$O$_5$ (for Mg-ion battery); V$_2$O$_5$, VO$_2$, TiO$_2$, MoO$_2$, FeS$_2$, Mo$_6$S$_8$, SnS$_2$, NiS, CuS, graphite, amorphous carbons (for Al-ion battery).

In some embodiments, the battery comprises an anode selected from the group consisting of Li$_4$Ti$_5$O$_{12}$, TiO$_2$, graphite, S, Sn/Si-based alloys, Li (for Li-ion battery); NaTiO$_2$, Na$_2$Ti$_3$O$_7$, TiO$_2$, Li$_4$Ti$_5$O$_{12}$, Na$_2$C$_8$H$_4$O$_4$, Na$_2$C$_{10}$H$_2$O$_4$, Na$_4$Ti$_5$O$_{12}$, MoS$_2$, Co$_3$O$_4$, Fe$_3$O$_4$, Sn, SnSb, ZnS, hard carbon, Sn$_x$P$_3$, Cu$_x$O, SnS$_x$, Graphene (for Na-ion battery); MoS$_2$, PAQS, K$_2$TP, Co$_3$O$_4$—Fe$_2$O$_3$, Graphite, K$_2$Ti$_4$O$_{17}$ (for K-ion battery); Mg, Li$_4$Ti$_5$O$_{12}$, α-MnO$_2$, Mg$_x$Mo$_3$S$_4$, TiS$_2$, WSe$_2$ (for Mg-ion battery); Graphite, Al (for Al-ion battery).

In one embodiment, a method for manufacturing a battery comprises providing an anode and a cathode; preparing an electrolyte from a salt, a water and at least one type of molecular crowding agent as defined above; assembling the anode and the cathode with the electrolyte, thereby obtaining the battery.

EXAMPLE

The following examples facilitate better understanding of the disclosure, and are not intended to limit the disclosure in any way. Unless otherwise specifically indicated, the test methods used in the following examples are conventional methods. Unless otherwise specifically indicated, the materials, reagents, etc. used in the following examples are commercially available reagents and materials.

Example 1: Preparation of Molecular Crowding Type Electrolyte

Molecular crowding solvent was prepared by mixing polyethylene glycol 400 (PEG 400, Aladdin) with deionized water (purified on a MilliQ device from Millipore) at a series of weight ratios (PEG: H$_2$O=71:29, 80:20, 90:10, 94:6, 100:0 as shown in Table 1). Then 2 m (molality, mol/kg) lithium bis(trifluoromethanesulfonyl)imide (LiTFSI, Sigma-Aldrich) was dissolved into the PEG-H$_2$O co-solvent or pure PEG solvent, thereby obtaining the molecular crowding type electrolyte.

Molecular crowding electrolyte for K-ion battery was prepared by mixing PEG 400 with deionized water at a series of weight ratios (PEG: H$_2$O=75:25, 94:6). Then 1 m (molality, mol/kg) potassium trifluoromethane sulfonate Sigma-Aldrich) was dissolved into the PEG-H$_2$O solvent.

All the electrolytes were fabricated in an Argon-filled glove box at room temperature after bubbling water and PEG 400 with argon for 10 minutes to prevent oxygen contamination on electrodes.

TABLE 1

Composition of 2m LiTFSI-xPEG-(1-x)H$_2$O electrolyte

| | Solvent (wt %) | |
|---|---|---|
| Electrolytes | PEG 400 | H$_2$O |
| 2m LiTFSI-71P | 71 | 29 |
| 2m LiTFSI-80P | 80 | 20 |
| 2m LiTFSI-90P | 90 | 10 |
| 2m LiTFSI-94P | 94 | 6 |
| 2m LiTFSI-100P | 100 | 0 |

Example 2: Preparation of Comparative Electrolytes

Electrolytes of 2 m LAM 21 m LiTFSI, Hydrate melt 19.4 m LiTFSI-8.3 m Lithium bis(pentafluoroethanesulfonyl)imide(LiBETI) and 32 m potassium acetate (KAc)-8 m lithium acetate(LiAc), 1 m KTF were fabricated by adding 2 m LiTFSI, 21 m LiTFSI, 19.4 m LiTFSI+8.3 m LiBETI (TCl), 32 m KAc (Sigma-Aldrich)+8 m LiAc (Sigma-Aldrich), 1 m KTF into deionized water respectively. All the solutions were fabricated in an Argon-filled glove box at room temperature after bubbling water and PEG 400 with argon for 10 minutes to prevent oxygen contamination on electrodes.

The solid polymer electrolyte LiTFSI-PEO were fabricated by mixing LiTFSI, Poly(ethylene oxide) (PEO, average Mv 400,000, Sigma-Aldrich) and acetonitrile (Sigma-Aldrich) with the EO to Li ratio of 11:1, followed by casting and drying in a vacuum oven at 60° C. for 12 h Example 3: Assays for Electrolytes The ionic conductivity was measured via the A.C. impedance method using VMP3 electrochemical testing unit (Bio-Logic, France). A cell with a pair of aluminum foil electrodes was used, and the cell constant was defined with respect to a standard KCl aqueous solution. Flammability tests were performed by soaking ignited matches into commercial 1 m LiPF$_6$ in EC:DEC (vol %=1:1,) and 2 m LiTFSI-94% PEG-6% $H_2O$. $^1H$ NMR spectra was acquired on a Bruker AVANCE III HD 500 NMR spectrometer using deuterated DMSO as field frequency lock. Fourier transform infrared (FTIR) spectroscopy was performed using a Bruker ALPHA FTIR spectrometer. All the testing was performed at 25° C.

Figure 5:
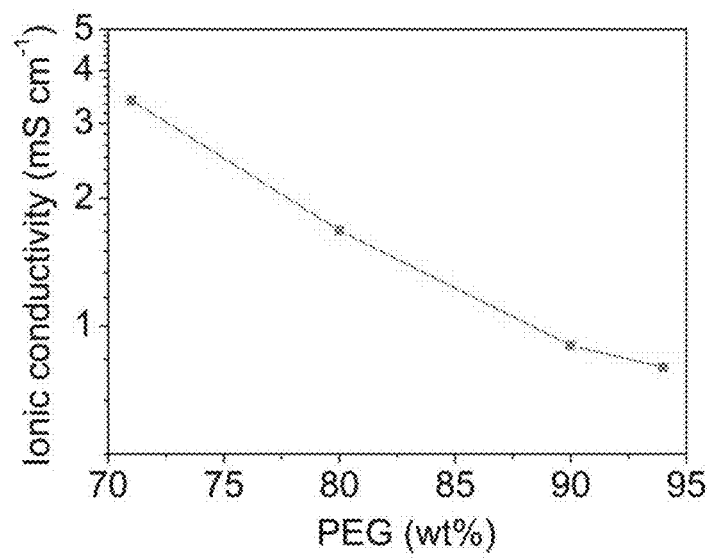
FIG. 5 illustrates ionic conductivity of the molecular crowding type electrolytes of the disclosure, wherein the ionic conductivity of 2 m LiTFSI-xPEG-(1-x)$H_2O$ is measure at 25° C., and wherein x=71, 80, 90, 94%.

The ionic conductivity and flammability of the molecular crowding type electrolytes of the disclosure were first evaluated. FIG. 5 shows the ionic conductivity of the 2 m LiTFSI-x PEG-(1-x) $H_2O$ electrolytes as a function of PEG content at 25° C. The ionic conductivity of the electrolyte ranges from 0.8 mS cm$^{-1}$ to 3.4 mS cm$^{-1}$ with PEG content ranging from 94 wt % to 71 wt %, which is comparable with that of WIS electrolytes (as listed in Table 2).

TABLE 2

Composition and conductivity of fluorine riched "Water-in-salt" electrolytes for Li-ion batteries

| Electrolyte | Composition (wt %) | Ionic conductivity (mS cm$^{-1}$) | Ref. |
|---|---|---|---|
| "Water-in-Salt" 21m LiTFSI | LiTFSI: 85.8<br>$H_2O$: 14.2 | 8.21 (25° C.) | 6 |
| "Water-in-Bisalt" 21m LiTFSI-7m LiOTf | LiTFSI: 74.2<br>LiOTf: 13.5<br>$H_2O$: 12.3 | 16.1 (60° C.) | 7 |
| "Water-in-Bisalt" gel 21m LiTFSI-7m LiOTf-PVA | LiTFSI: 66.6<br>LiOTf: 12.6<br>PVA: 10.0<br>$H_2O$: 10.8 | N | 8, 9 |
| "Hydrate melt" Li(TFSI)$_{0.7}$(BETI)$_{0.3}$·2$H_2O$ (19.4m LiTFSI-8.3m LiBETI) | LiTFSI: 56.9<br>LiBETI: 32.9<br>$H_2O$: 10.2 | 3.0 (30° C.) | 4 |
| "Hybrid Aqueous/Nonaqueous" 21m LiTFSI in $H_2O$-9.25m LiTFSI in DMC(wt % = 1:1) | LiTFSI: 81.2<br>DMC: 9.4<br>$H_2O$: 9.4 | 5.0 (30° C.) | 10 |
| "Monohydrate melt" Li(PTFSI)$_{0.6}$(TFSI)$_{0.4}$·1$H_2O$ (22.2m LiTFSI-33.3m LiPTFSI) | LiTFSI: 34.2<br>LiPTFSI: 60.4<br>$H_2O$: 5.4 | 0.1 (30° C.) | 11 |
| Li(TFSI)$_{0.8}$(MM3411)$_{0.2}$·1.4$H_2O$ 31.4m LiTFSI-7.9m LiMM3411 | LiTFSI: 72.4<br>LiMM3411: 19.6<br>$H_2O$: 8.0 | 0.33 (25° C.) | 12 |

Figure 6:
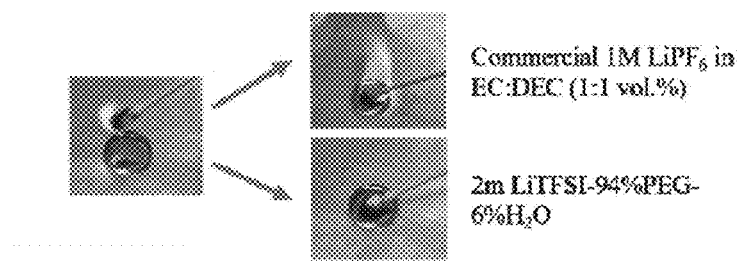
FIG. 6 illustrates the flammability testing of the commercial electrolyte and the electrolyte of the disclosure, wherein an ignited cotton swab is immersed in the commercial 1M LiPF$_6$ in EC/DEC(Vol %=1/1) and 2 m LiTFSI-94% PEG-6% $H_2O$, and as shown, 1M LiPF$_6$ in EC/DEC(Vol %=1/1) electrolyte is ignited immediately while the fire of cotton swab is extinguished in 2 m LiTFSI-94% PEG-6% $H_2O$.

For the flammability test, the electrolyte with the least water content (2 m LiTFSI-94% PEG-6% $H_2O$) was tested as it is expected to have the highest flammability (if any) among all compositions ($H_2O$ content: 6%-29%). As shown in FIG. 6, molecular crowding type aqueous electrolyte of the disclosure is nonflammable, confirming its superior safety than the commercial LiPF$_6$ in EC/DEC (vol %=1/1) electrolyte. To investigate the origin of high safety of the electrolyte of the disclosure and compare it to conventional solid polymer electrolyte, poly(ethylene oxide) (PEO), the flammability of 2 m LiTFSI-94% PEG-6% $H_2O$, 2 m LiTFSI-PEG and 2 m LiTFSI-PEO was measured. The snapshot (FIG. 7) shows that 2 m LiTFSI-94% PEG-6% $H_2O$ soaked glass fiber was not ignited, while 2 m LiTFSI-PEG was ignited, confirming that water is essential for the low flammability of electrolyte system of the disclosure. Furthermore, the conventional polymer electrolyte 2 m LiTFSI-PEO (EO/Li=11) was also ignited, indicating that 2 m LiTFSI-94% PEG-6% $H_2O$ exhibits superior safety compared to the solid PEO polymer electrolyte.

The electrochemical stability window of molecular crowding type aqueous electrolyte of the disclosure was determined by linear sweep voltammetry (LSV) using acetylene black (AB) coated aluminum foil. Aluminum foil was chosen as current collector as it is low-cost as well as inert owing to the protection of surface aluminum oxides layer. Instead of using bare current collector (low surface area) as working electrode for LSV measurement reported in literature, the LSV measurements were performed on AB coated Al foil to obtain electrolyte stability window in a more realistic environment since high-surface-area carbon black (e.g. AB) is often used as electrode conducting additives. As shown in FIG. 1a, the overall stability window of the molecular crowding type aqueous electrolyte expands to 3.2 V as the PEG concentration increases to 94 wt %, pushing the hydrogen evolution reaction (HER) potentials well beyond the thermodynamic stability limits of water. The HER potential decreased from 2.6 V versus Li$^+$/Li in 2 m LiTFSI aqueous electrolyte to 1.3 V versus Li$^+$/Li in 2 m LiTFSI-94% PEG-6% $H_2O$. This result demonstrates that the presence of PEG in the molecular crowding type aqueous electrolyte successfully suppressed the HER reaction by 1300 mV at a low salt concentration (2 m LiTFSI).

To provide a direct comparison of the electrolyte water stability of the developed molecular crowding type electrolyte with other state-of-the-art aqueous electrolytes that use highly-concentrated salts (including 21 m LiTFSI, hydrate melt 19.4 m-LiTFSI-8.3 m LiBETI, 32 m KAc-8 m LiAc) in unified conditions, the LSV measurements were performed on AB coated Al foil and OEMS measurements on L-LTO/LMO full cells.

Figure 3:
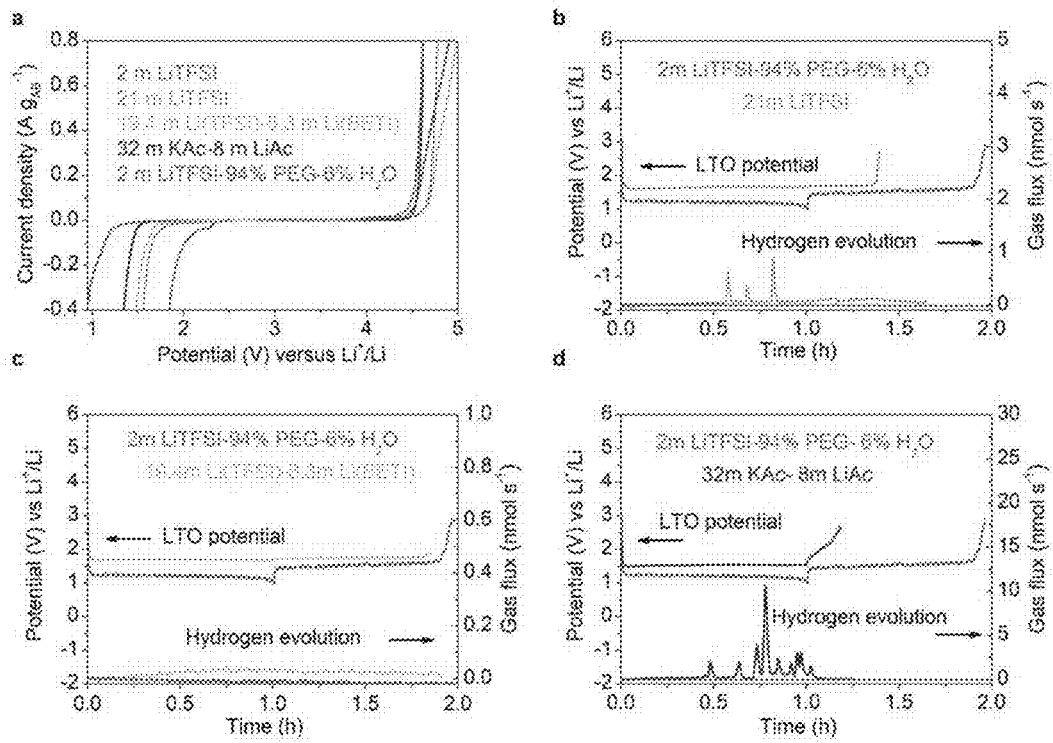
FIG. 3 illustrates the HER stability of the molecular crowding type electrolyte of the disclosure, wherein (a) shows electrochemical stability windows for various electrolytes determined by liner sweep voltammetry tests on AB coated aluminum foil at a scan rate of 0.2 mV/s; (b-d) show OEMS testing for L-LTO/LMO full cell in 21 m LiTFSI, 32 m KAc-8 m LiAc, hydrate-melt 19.4 m LiTFSI-8.3 m LiBETI electrolyte during the 1$^{st}$ cycle at 1C compared with 2 m LiTFSI-94% PEG-6% $H_2O$.
Figure 10:
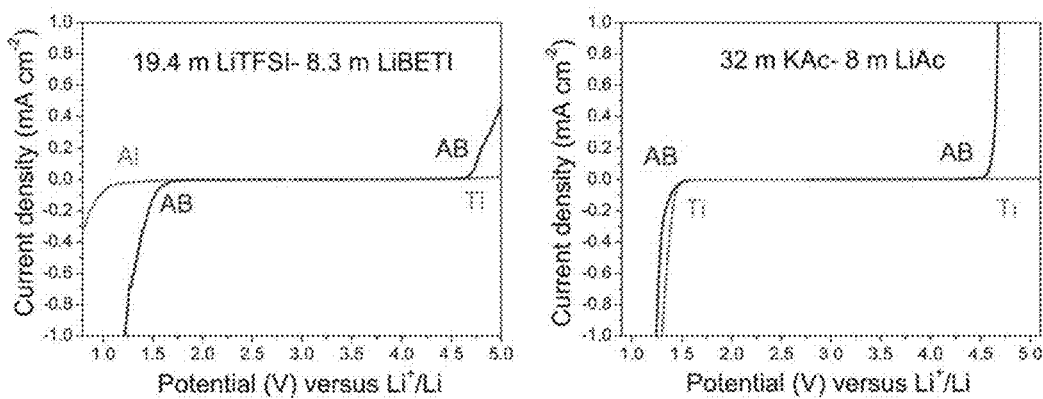
FIG. 10 illustrates comparison of electrochemical stability window obtained from different working electrodes, wherein (a) shows electrochemical stability windows of hydrate melt 19.4 m LiTFSI-8.3 m LiBETI determined by liner sweep voltammetry tests on AB coated Al foil and bare Al/Ti current collector (Al for cathodic scanning and Ti for anodic scanning); (b) shows electrochemical stability windows of 32 m KAc-8 m LiAc determined by liner sweep voltammetry tests on AB coated Al foil and bare Ti current collector.

As shown in FIG. 3a, the developed 2 m LiTFSI-94% PEG-6% $H_2O$ shows the lowest HER onset potential compared to other state-of-the-art aqueous electrolytes that use highly-concentrated salts. OEMS measurements using L-LTO/LMO cells in various electrolytes were conducted (1C, 1$^{st}$ cycle). The stability windows of the reported electrolytes and the molecular crowding type electrolyte of disclosure as shown in FIG. 3a were experimentally obtained from LSV on AB coated Al foil, which is different and a harsher condition compared to the reported values determined by bare current collector (e.g. Al, Ti foil). FIG. 10 shows that the reported stability window values of each reported electrolyte can be reproduced in the cells when using the same electrode as bare current collectors. FIG. 10 also confirms that AB coated is harsher condition for measuring electrolyte stability windows.

Hydrogen evolution signal was compared in FIG. 3b-d. Significant hydrogen gas was detected in 21 m LiTFSI (FIG. 3b) and 32 m KAc-8 m LiAc electrolyte (FIG. 3d) with low discharge capacities due to severe water decomposition. The hydrogen gas evolution in 19.4 m-LiTFSI-8.3 m LiBETI (FIG. 3c) can explain that a lower capacity was achieved at low C-rates (0.2 C, 0.5 C) compared with that at high C-rates (10 C) in hydrate melt electrolytes owing to water decomposition. Because the theoretical reversible redox potential of LTO in dilute Li salt electrolyte is 0.2-0.3 V lower than that in highly concentrated Li salt electrolyte (e.g. 21 m LiTFSI, 19.4 m-LiTFSI-8.3 m LiBETI) due to the lower $Li^+$ chemical activity, the parasitic HER is supposed to be more severe in the molecular crowding dilute Li salt electrolyte of the disclosure (2 m LiTFSI-94% PEG-6% $H_2O$).

Figure 4:
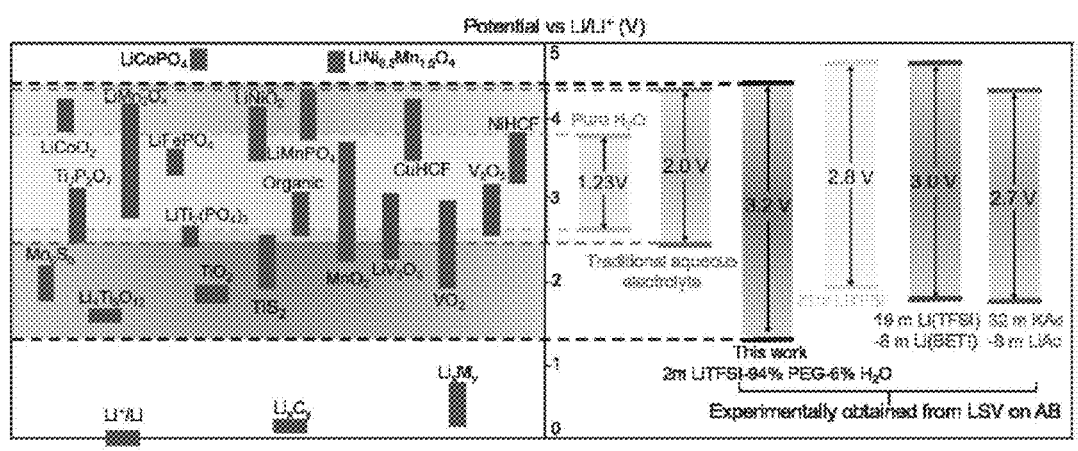
FIG. 4 illustrates comparison of the measured electrolyte stability window of various aqueous electrolytes and potential electrode materials, wherein redox potential of electrode materials for lithium ion batteries and electrochemical stability window of pure water, traditional aqueous electrolyte, 21 m LiTFSI, hydrate-melt 19.4 m-LiTFSI-8.3 m LiBETI, 32 m KAc-8 m LiAc and 2 m LiTFSI-94% PEG-6% $H_2O$ are tested, and wherein the stability window of WIS electrolytes and 2 m LiTFSI-94% PEG-6% $H_2O$ is experimentally obtained from LSV on AB coated Al foil, which is different from the reported value of stability window determined using bare current collector (e.g. Al, Ti foil).

The fact that hydrogen evolution potential is much lower in the molecular crowding dilute Li salt electrolyte than other highly concentrated WIS electrolytes further supports the significant suppression of HER by the crowding agent PEG. The molecular crowding type aqueous electrolyte of the disclosure offers an effective strategy to widen water stability window for aqueous Li-ion battery, especially on suppressing HER, which is urgent in developing high-energy aqueous Li-ion batteries since many negative electrode materials are not stable when using traditional aqueous electrolyte (FIG. 4). For positive electrode materials, most of them already lay within the stable range of traditional aqueous electrolyte since OER overpotential is large due to sluggish kinetic process. The crowding agent PEG of the disclosure demonstrates unprecedented HER stability in aqueous Li-ion batteries without using highly concentrated salts (FIGS. 3 and 4), enabling numerous negative electrode materials to be used in aqueous battery systems.

Example 4: Fabrication of Electrode

The pristine materials $Li_4Ti_5O_{12}$(LTO) and $LiMn_2O_4$ (LMO) powders were provided by MTI Corporation, and $Li_{1.3}Al_{0.3}Ti_{1.7}(PO_4)_3$(LATP) coated LTO (L-LTO) was prepared by sol-gel method. The raw reagents lithium hydroxide ($LiOH.H_2O$, sinopharm group co. ltd), aluminium nitrate nonahydrate ($Al(NO_3)_3.9H_2O$, sinopharm group co. ltd), titanium tetraisopropanolate ($C_{12}H_{28}O_4Ti$, Ourchem), ammonium phosphate monobasic ($NH_4H_2PO_4$, sinopharm group co. ltd) with stoichiometric amounts were added into ethanol to form the pre-LATP gel (total mass of reagents/volume of ethanol=8 mg/mL). Then, LTO powders were added into ethanol (mass of LTO/volume of ethanol=12 mg/mL) with a certain amount of pre-LATP gel (corresponding to 3 wt % LATP) followed by stirring, evaporation and dry at 60° C. Finally, L-LTO was obtained after the mixture was calcined at 650° C. for 4 h under air atmosphere in a furnace.

To prepare electrode films of LMO, L-LTO, the active material powder was well mixed with acetylene black (AB, MTI) and polyvinylidene difluoride (PVDF, Kureha) in N-methylpyrrolidone (NMP, Wako) solvent with weight ratios of active material:AB:PVDF of 8:1:1. To fabricate AB working electrode and activated carbon (AC, Yihuan Carbon Co., Ltd, China) counter electrode, the AB/AC powders were well mixed with PV DF in NMP solvent with weight ratios of AB:PVDF=1:1 and AC:PVDF=9:1. The obtained slurry was uniformly spread onto aluminum foil (techcrystal industries ltd.) using a doctor blade and dried at 80° C. under vacuum for 12 h. The electrode sheets were punched out to form disc electrodes with a diameter of 12 mm, thereby obtaining the electrode for test.

To prepare pre-coated Li metal, the highly fluorinated ether (HFE, 1,1,2,2-Tetrafluoroethyl 2,2,3,3-tetrafluoropropyl ether, synquest laboratories) gel was prepared by mixing 10 wt % PEO in 0.5 M LiTFSI in HFE/DMC (volume ratio=95:5) and heated at 50° C. for 60 min under stirring 10 wt % acetonitrile was added to assist the PEO dissolution and gel formation. The fabrication process is partially adopted from reference (Yang, C. et al Joule 1, 122 (2017); Yang, C. et al. Nature 570, E65-E65 (2019)). The Li metal with a diameter of 12 mm and its steel current collector were pre-coated with HFE gel before Li/LMO cell assembling.

Example 5: Electrochemical Measurements and DFT-MD Simulation

The electrochemical stability window was determined using three-electrode devices consisting of AB working electrode (AB loading=0.5 mg $cm^{-1}$), AC counter electrode (AC loading=20-30 mg $cm^{-1}$) and Ag/AgCl reference electrode (ALS, RE-3VT screw type). The cyclic voltammetry testing was performed with L-LTO/LMO (1 mg $cm^{-2}$) prepared in example 2 as working electrode, AC electrode as counter electrode, and Ag/AgCl as reference electrode. The linear scanning voltammetry (LSV) and cyclic voltammetry (CV) experiments were conducted using VMP3 electrochemical testing unit (Bio-Logic, France).

The full cell was constructed in Argon-filled glove box with L-LTO negative electrode, LMO positive electrode and glass fiber separator in 2032-type coin cell, the loading of active material LTO and LMO is 2.5 mg $cm^{-1}$ and 3.0 mg $cm^{-1}$, respectively. To minimize the side reactions between aqueous electrolyte and steel coin cell components, Al foils were placed between the electrodes and steel cell components. Galvanostatic cycling was tested using LAND Battery Testing System (Land, Wuhan Land Electronic Co., Ltd.).

Figure 2:
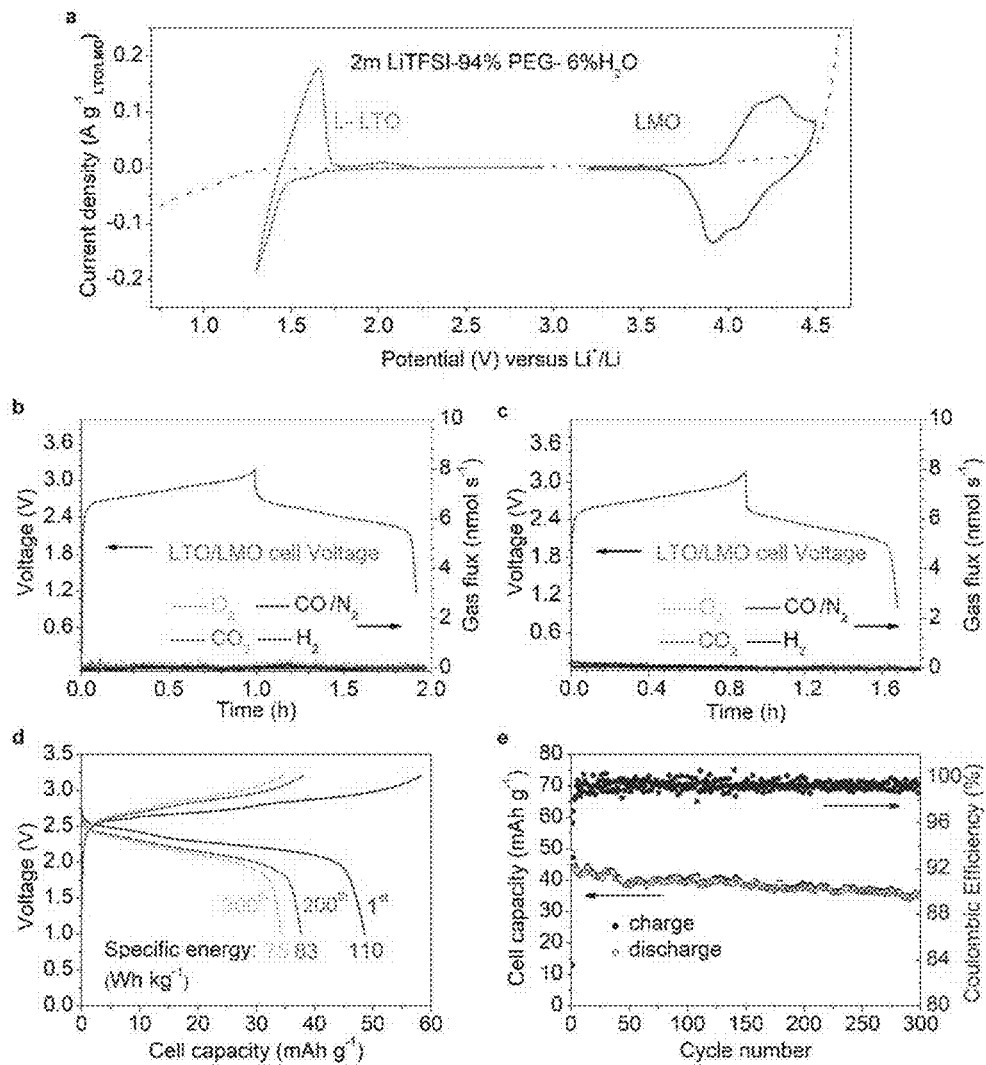
FIG. 2 illustrates electrochemical behavior and OEMS of L-LTO/LMO full cell in 2 m LiTFSI-94% PEG-6% $H_2O$, wherein (a) shows cyclic voltammetry profiles collected in 2 m LiTFSI-94% PEG-6% $H_2O$ at 0.2 mV s$^{-1}$ for LMO and LATP coated LTO (L-LTO), and the dash line indicates the stability window of 2 m LiTFSI-94% PEG-6% $H_2O$ obtained from liner sweep voltammetry tests on AB coated Al foil at 0.2 mV s$^{-1}$; (b-c) show OEMS results of L-LTO/LMO full cell conducted in 2 m LiTFSI-94% PEG-6% $H_2O$ during the 1$^{st}$ and 10$^{th}$ cycle at 1C (0.104 A g$^{-1}$ for LMO); (d) shows the voltage profiles of 1$^{st}$, 200$^{th}$ and 300$^{th}$ cycling of L-LTO/LMO cell in 2 m LiTFSI-94% PEG-6% $H_2O$ at 1C; (e) shows cycling stability and coulombic efficiency of L-LTO/LMO cell in 2 m LiTFSI-94% PEG-6% $H_2O$ at 1C, and wherein the cell capacity was calculated on the basis of the total weight of the positive and negative active materials.
Figure 12:
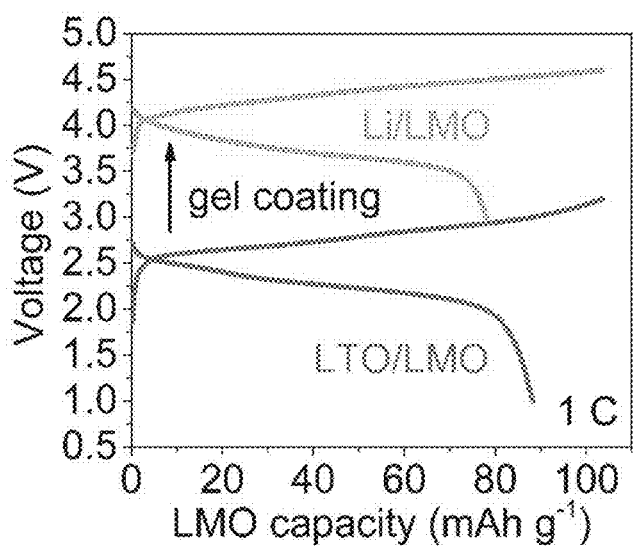
FIG. 12 illustrates the voltage profile of LTO/LMO and gel pre-coated Li/LMO at 1C in 2 m LiTFSI-94% PEG-6% $H_2O$ electrolyte during the 1$^{st}$ cycle. It shows the potential application of the electrolyte of the disclosure for 4.0V aqueous battery.
Figure 13:
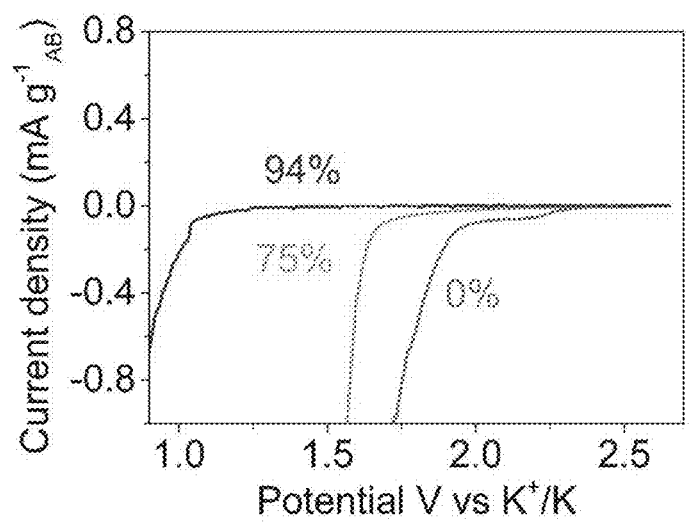
FIG. 13 illustrates the hydrogen evolution reaction (HER) onset potentials for 1 m KTF-xPEG-(1-x)$H_2O$ (x=0, 75, 94%) determined by liner sweep voltammetry tests on AB coated aluminum foil at a scan rate of 0.2 mV/s. It shows that HER is suppressed upon the addition of PEG.

Specifically, L-LTO/LMO full cell was prepared by using $LiMn_2O_4$ cathode (LMO, 4.0 V versus $Li^+$/Li), spinel $Li_4Ti_5O_{12}$ anode (1.55V versus $Li^+$/Li, with 3 wt % LATP coating, i.e., L-LTO) and the 2 m LiTFSI-94% PEG-6% $H_2O$ electrolyte. The reversible electrochemical behavior of LATP coated-LTO (L-LTO) electrode and LMO electrode in the 2 m LiTFSI-94% PEG-6% $H_2O$ electrolyte was confirmed by the cyclic voltammetry (CV) measurements (FIG. 2a). Li/LMO full cell was fabricated using HFE pre-coated Li metal as anode and LMO as cathode. The $1^{st}$ cycle of Li/LMO was shown in FIG. 12, confirming the operational voltage can be further improved to over 4.0 V upon adopting pre-coated Li, indicating the promising application of the electrolyte of the disclosure for high voltage aqueous batteries.

Figure 11:
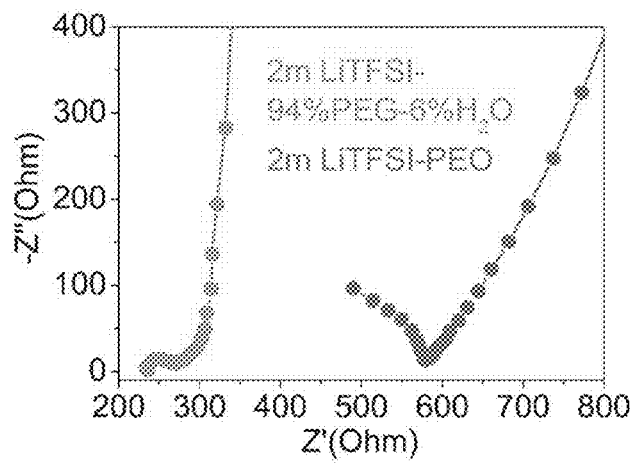
FIG. 11 illustrates the Nyquist plots of electrochemical impedance spectroscopy(EIS) for the LTO/LMO full cell with 2 m LiTFSI-94% PEG-6% $H_2O$ and 2 m LiTFSI-PEO at 25° C. It shows that the interfacial resistance of 2 m LiTFSI-94% PEG-6% $H_2O$ is much smaller than polymer electrolyte LiTFSI-PEO.

The interfacial resistance of 2 m LiTFSI-94% PEG-6% $H_2O$ electrolyte and the traditional solid polymer electrolyte LiTFSI-PEO (Li/EO=1:11) was compared using electrochemical impedance spectroscopy(EIS) tesing. FIG. 11 shows that the battery with 2 m LiTFSI-94% PEG-6% $H_2O$ electrolyte exhibits lower interfacial resistance then that with LiTFSI-PEO electrolyte, which is critical in achieving high performance of batteries.

The online electrochemical mass spectroscopy (OEMS) measurement was performed on a QMS 200 atmospheric sampling system (Stanford Research Systems, Inc., USA), which was connected to the assembled electrochemical cell. Two SS316 tubes with ball valves were wielded on the top of the cell to allow the connection of the pressure transducer for $H_2/O_2$ evolution monitoring, or to allow continuous sampling of the evolved gas in the cell head space by the Ar carrier gas (N5.0, HKO, Hong Kong) and subsequent analysis in a mass spectrometer (QMS 200, Stanford Research Systems).

The quantification of gas was calibrated by a standard gas mixture of $O_2$, $CO_2$, CO, $H_2$, and $H_2O$ (5000 ppm each, balanced by Ar. Linde HKO, Hong Kong) to convert the mass spectrometer signals into concentrations. To collect the real-time signal of evolved gas, small holes were made on the electrode foils by needle before assembling OEMS cells in Argon-filled glove box. Al foils were placed between the electrodes and steel cell components to minimize the side reactions between aqueous electrolyte and steel components.

OEMS was used to monitor gas evolution during charge and discharge process of L-LTO/LMO full cell at 1C in 2 m LiTFSI-94% PEG-6% $H_2O$. It was observed that no $H_2$, $O_2$, $CO/N_2$ or $CO_2$ gas was generated upon cycling (see FIGS. 2b and 2c), indicating that no water decomposition occurred in L-LTO/LMO cell with the molecular crowding type aqueous electrolyte. Galvanostatic voltage profiles and capacity retention of the aqueous L-LTO/LMO full cell are shown in FIG. 2d and FIG. 2e, respectively. Using the molecular crowding type electrolyte with a low salt concentration (2 m), an initial specific energy of 110 Wh $kg^{-1}$ was achieved at 1C and 75 Wh $kg^{-1}$ was maintained after 300 cycles with a high average coulombic efficiency (~99%), demonstrating comparable specific energy and stability as the reported aqueous Li-ion batteries using high salt concentrations (21 m-40 m). The cell capacity was calculated on the basis of the total weight of the positive and negative active materials.

All the DFT-MD simulations were carried out by using the projector augmented wave pseudopotentials and Perdew-Burke-Ernzerhof parametrization of the generalized gradient approximation as implemented in the Vienna ab initio simulation package (VASP). After geometry optimization with ionic and electronic self-consistent convergence of $10^{-3}$ and $10^{-4}$ eV, respectively, the MD simulations were performed using cubic cells with a linear dimension of 10.6 Å for 2 m LiTFSI-$H_2O$ (containing 1 LiTFSI, 27 $H_2O$) and 13.4 Å for 2 m LiTFSI-94% PEG-6% $H_2O$ (containing 2 LiTFSI, 5 $H_2O$, 3 $HO(CH_2CH_2O)_9H$) in NVT ensemble at 300 K with a time step of 1 fs. 2 m LiTFSI-$H_2O$ system was first equilibrated for 4 ps and the following 6 ps were used for analysis, 2 m LiTFSI-94% PEG-6% $H_2O$ system was equilibrated for 20 ps and the subsequent 100 ps were used for analysis.

Figure 9:
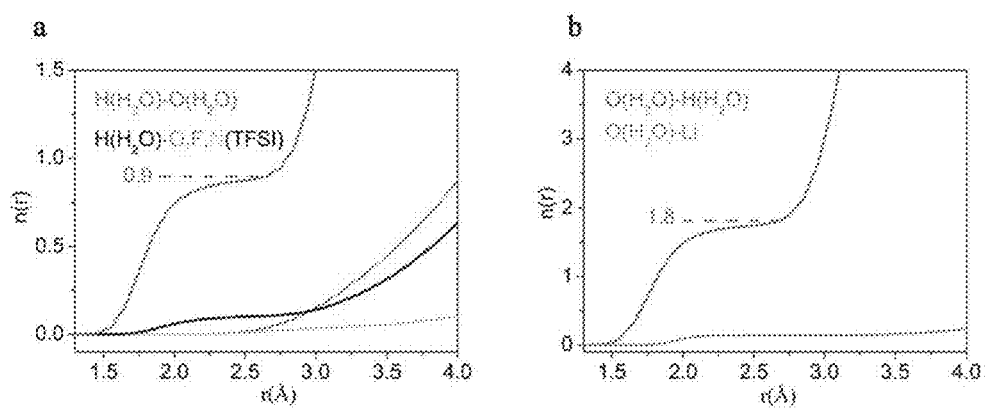
FIG. 9 illustrates the coordination environment of water molecules in 2 m LiTFSI-$H_2O$ electrolyte, wherein (a) shows the running $H(H_2O)$ coordination numbers (b) shows the running $O(H_2O)$ coordination numbers, and wherein the coordination numbers are obtained from pair distribution function integral during MD simulations, and in order to show the hydrogen bond structure more intuitively, the coordination numbers for the covalence shell have been subtracted.

The DFT-MD simulation results revealed the unique structure of the molecular crowding type electrolytes and showed that water molecules are hydrogen-bonded to PEG, which is consistent with the resulted strengthened H—O covalent bond in water observed in NMR and FT-IR measurements (see FIGS. 1f, 1g and 9).

The disclosure provides a novel molecular crowding type aqueous electrolytes using water-miscible polymer poly (ethylene glycol) (PEG) or its derivative as crowding agent to stabilize water molecules, which has been demonstrated a stable voltage window of 3.2 V and unprecedented hydrogen evolution reaction stability with a dilute Li salt concentration (2 m LiTFSI). The developed electrolyte enables reversible Li-ion intercalation/extraction of the full L-LTO/LMO cell, delivering a high energy density of 75-110 Wh/kg over 300 cycles at 1C.

Extensive electrolyte characterizations including NMR, FT-IR, OEMS and DFT-MD simulation were used to confirm the significant HER suppression effect of the molecular-crowding type aqueous electrolyte. This approach enables numerous negative intercalation electrodes to be used in aqueous systems without using highly concentrated salts. In addition, the production cost for the molecular-crowding type electrolyte is significantly lower than that of commonly used electrolytes (for example, as shown in Table 3).

TABLE 3

Comparison of price of PEG and commonly used fluorinated Li salt in "Water-in-Salt" electrolytes for Li-ion batteries

| Chemical | Sigma (USD/g) | TCl (USD/g) |
|---|---|---|
| LiTFSI | 4.2 | 1.8 |
| LiOTf | 5.0 | 2.5 |
| LiBETI | N | 43.6 |
| PEG-400 | 0.04 | 0.06 |

*the price is calculated based on the largest pack size

In view of the above, the molecular crowding type electrolyte of the disclosure is low-cost, eco-friendly and can be used for safe and sustainable energy storage applications.

While the above embodiments have been shown and described, it will be apparent to those skilled in the art that various changes and modifications may be made without departing from the invention in its broader aspects. The appended claims, therefore, are intended to cover all such changes and modifications as they fall within the true spirit and scope of the invention.

What is claimed is:

1. An electrolyte comprising a molecular crowding agent, a salt and a water, wherein the molecular crowding agent is a water-miscible or water-soluble polymer selected from the group consisting of poly(ethylene glycol), poly(propylene glycol), polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof, and wherein a weight ratio of the molecular crowding agent is from 65-98% based on the total weight of the molecular crowding agent and the water.

2. The electrolyte of claim 1, wherein the weight ratio of the molecular crowding agent is from 70-95% based on the total weight of the molecular crowding agent and the water.

3. The electrolyte of claim 1, wherein the molecular crowding agent has a number-average molecular weight of 100 to 1000.

4. The electrolyte of claim 1, wherein the molecular crowding agent is poly(ethylene glycol) with a number-average molecular weight of 400.

5. The electrolyte of claim 1, wherein the salt comprises a metal ion selected from the group consisting of $Li^+$, $Na^+$, $K^+$, $Mg^{2+}$, and $Al^{3+}$.

6. The electrolyte of claim 1, wherein the salt is selected from the group consisting of lithium bis(trifluoromethane) sulfonimide (LiTFSI), lithium trifluoromethane sulfonate (LiTF), lithium bis(fluorosulfonyl)imide (LiFSI), lithium bis(pentafluoroethane sulfonyl)imide (LiBETI), lithium 4,5-dicyano-2-(trifluoromethyl) imidazole (LiTDI), lithium fluoro(nonafluorobutane) (LiFNF), lithium perchlorate (LiClO$_4$), lithium nitrate (LiNO$_3$), lithium sulfate (Li$_2$SO$_4$), sodium bis(trifluoromethane)sulfonimide (NaTFSI), sodium trifluoromethane sulfonate (NaTF), sodium bis(fluorosulfonyl)imide (NaFSI), sodium bis(pentafluoroethane sulfonyl) imide (NaBETI), sodium 4,5-dicyano-2-(trifluoromethyl) imidazole (NaTDI), sodium fluoro(nonafluorobutane) (NaFNF), sodium perchlorate (NaClO$_4$), sodium nitrate (NaNO$_3$), sodium sulfate (Na$_2$SO$_4$), potassium bis(trifluoromethane)sulfonimide (KTFSI), potassium trifluoromethane sulfonate (KTF), potassium bis(fluorosulfonyl)imide (KFSI), potassium bis(pentafluoroethane sulfonyl)imide (KBETI), potassium 4,5-dicyano-2-(trifluoromethyl)imidazole (KTDI), potassium fluoro(nonafluorobutane) (KFNF), potassium perchlorate (KClO$_4$), potassium nitrate (KNO$_3$), potassium sulfate (K$_2$SO$_4$), magnesium bis(trifluoromethane)sulfonimide (Mg(TFSI)$_2$), magnesium trifluoromethane sulfonate (Mg(TF)$_2$), magnesium bis(fluorosulfonyl)imide Mg(FSI)$_2$), magnesium bis(pentafluoroethane sulfonyl)imide (Mg(BETI)$_2$), magnesium 4,5-dicyano-2-(trifluoromethyl)imidazole (Mg(TDI)$_2$), magnesium fluoro(nonafluorobutane) Mg(FNF)$_2$, magnesium perchlorate (Mg(ClO$_4$)$_2$), magnesium nitrate (Mg(NO$_3$)$_2$), magnesium sulfate (MgSO$_4$), aluminum bis(trifluoromethane)sulfonimide Al(TFSI)$_3$, aluminum trifluoromethane sulfonate Al(TF)$_3$, aluminum bis(fluorosulfonyl)imide Al(FSI)$_3$, aluminum bis(pentafluoroethane sulfonyl)imide Al(BETI)$_3$, aluminum 4,5-dicyano-2-(trifluoromethyl)imidazole Al(TDI)$_3$, lithium fluoro(nonafluorobutane) Al(FNF)$_3$, aluminum perchlorate (Al(ClO$_4$)$_3$), aluminum nitrate (Al(NO$_3$)$_3$), and aluminum sulfate (Al$_2$(SO$_4$)$_3$).

7. The electrolyte of claim 1, wherein the salt has a concentration of 1 molality to 5 molality based on the total weight of the electrolyte.

8. A battery comprising an anode, a cathode and an electrolyte, wherein the electrolyte comprises a molecular crowding agent, a salt and a water, and wherein the molecular crowding agent is a water-miscible or water-soluble polymer selected from the group consisting of poly(ethylene glycol), poly(propylene glycol), polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof, and wherein a weight ratio of the molecular crowding agent is from 65-98% based on the total weight of the molecular crowding agent and the water.

9. The battery of claim 8, wherein the weight ratio of the molecular crowding agent is from 70-95% based on the total weight of the molecular crowding agent and the water.

10. The battery of claim 8, wherein the molecular crowding agent has a number-average molecular weight of 100 to 1000.

11. The battery of claim 8, wherein the molecular crowding agent is poly(ethylene glycol) with a number-average molecular weight of 400.

12. The battery of claim 8, wherein the salt is a metal ion-containing salt which can release metal ions including at least one of Li$^+$, Na$^+$, K$^+$, Mg$^{2+}$, and Al$^{3+}$.

13. The battery of claim 8, wherein the salt is selected from the group consisting of lithium bis(trifluoromethane)sulfonimide (LiTFSI), lithium trifluoromethane sulfonate (LiTF), lithium bis(fluorosulfonyl)imide (LiFSI), lithium bis(pentafluoroethane sulfonyl)imide (LiBETI), lithium 4,5-dicyano-2-(trifluoromethyl) imidazole (LiTDI), lithium fluoro(nonafluorobutane) (LiFNF), lithium perchlorate (LiClO$_4$), lithium nitrate (LiNO$_3$), lithium sulfate (Li$_2$SO$_4$), sodium bis(trifluoromethane)sulfonimide (NaTFSI), sodium trifluoromethane sulfonate (NaTF), sodium bis(fluorosulfonyl)imide (NaFSI), sodium bis(pentafluoroethane sulfonyl) imide (NaBETI), sodium 4,5-dicyano-2-(trifluoromethyl) imidazole (NaTDI), sodium fluoro(nonafluorobutane) (NaFNF), sodium perchlorate (NaClO$_4$), sodium nitrate (NaNO$_3$), sodium sulfate (Na$_2$SO$_4$), potassium bis(trifluoromethane)sulfonimide (KTFSI), potassium trifluoromethane sulfonate (KTF), potassium bis(fluorosulfonyl)imide (KFSI), potassium bis(pentafluoroethane sulfonyl)imide (KBETI), potassium 4,5-dicyano-2-(trifluoromethyl) imidazole (KTDI), potassium fluoro(nonafluorobutane) (KFNF), potassium perchlorate (KClO$_4$), potassium nitrate (KNO$_3$), potassium sulfate (K$_2$SO$_4$), magnesium bis(trifluoromethane)sulfonimide (Mg(TFSI)$_2$), magnesium trifluoromethane sulfonate (Mg(TF)$_2$), magnesium bis(fluorosulfonyl)imide (Mg(FSI)$_2$), magnesium bis(pentafluoroethane sulfonyl)imide (Mg(BETI)$_2$), magnesium 4,5-dicyano-2-(trifluoromethyl) imidazole (Mg(TDI)$_2$), magnesium fluoro(nonafluorobutane) (Mg(FNF)$_2$), magnesium perchlorate (Mg(ClO$_4$)$_2$), magnesium nitrate (Mg(NO$_3$)$_2$), magnesium sulfate (MgSO$_4$), aluminum bis(trifluoromethane)sulfonimide (Al(TFSI)$_3$), aluminum trifluoromethane sulfonate (Al(TF)$_3$), aluminum bis(fluorosulfonyl)imide (Al(FSI)$_3$), aluminum bis(pentafluoroethane sulfonyl)imide (Al(BETI)$_3$), aluminum 4,5-dicyano-2-(trifluoromethyl) imidazole (Al(TDI)$_3$), aluminum fluoro(nonafluorobutane) (Al(FNF)$_3$), aluminum perchlorate (Al(ClO$_4$)$_3$), aluminum nitrate (Al(NO$_3$)$_3$), and aluminum sulfate (Al$_2$(SO$_4$)$_3$).

14. The battery of claim 8, wherein the salt has a concentration of 1 molality to 5 molality based on the total weight of the electrolyte.

15. The battery of claim 8, wherein the anode comprises a material containing Li, Na, K, Mg or Al element, and the cathode comprises a material containing Li, Na, K, Mg or Al element.

16. The battery of claim 15, wherein the anode comprises one or more selected from the group consisting of Li$_4$Ti$_5$O$_{12}$, TiO$_2$, graphite, S, Sn/Si-based alloys, Li, NaTiO$_2$, Na$_2$Ti$_3$O$_7$, Na$_2$C$_8$H$_4$O$_4$, Na$_2$C$_{10}$H$_2$O$_4$, Na$_4$Ti$_5$O$_{12}$, MoS$_2$, Co$_3$O$_4$, Fe$_3$O$_4$, Sn, SnSb, ZnS, hard carbon, Sn$_x$P$_3$, Cu$_x$O, SnS$_x$, graphene, MoS$_2$, polyanthraquinone sulfide (PAQS), K$_2$TP, Co$_3$O$_4$—Fe$_2$O$_3$, K$_2$Ti$_4$O$_{17}$, Mg, α-MnO$_2$, Mg$_x$Mo$_3$S$_4$, TiS$_2$, WSe$_2$, and Al.

17. The battery of claim 15, wherein the cathode comprises one or more selected from the group consisting of LiMn$_2$O$_4$, LiCoO$_2$, LiNi$_{0.33}$Mn$_{0.33}$Co$_{0.33}$O$_2$, LiNi$_{0.5}$Mn$_{1.5}$O$_2$, LiCoPO$_4$, LiNiPO$_4$, Na$_4$Fe(CN)$_6$, Na$_2$Fe$_2$(SO$_4$)$_3$, Na$_3$V$_2$(PO$_4$)$_2$F$_3$, Na$_2$MnP$_2$O$_7$, Na$_4$V$_4$(P$_2$O$_7$)$_4$(PO$_4$), Na$_{1.5}$VPO$_{4.8}$F$_{0.7}$, Na$_4$Ni$_{0.3}$Co$_{0.24}$Mn$_{0.3}$(PO$_4$)$_2$ (P$_2$O$_7$), Na$_{2/3}$(Ni$_{1/3}$Mn$_{2/2}$)O$_2$, Na(Li$_{0.05}$Ni$_{0.25}$Fe$_{0.25}$Mn$_{0.5}$)$_{0.95}$)O$_2$, Na$_x$(Fe$_{1/2}$Mn$_{1/2}$)O$_2$, Na$_4$Fe$_2$(CN)$_6$, KVPO$_4$F, KNiFe(CN), FeSO$_4$F, KMnFe(CN)$_6$, K$_3$V$_2$(PO$_4$)$_3$, CuHCF, NiHCF, RuO$_2$, Birnessite-type MnO$_2$, V$_2$O$_5$, VO$_2$, TiO$_2$, MoO$_2$, FeS$_2$, Mo$_6$S$_8$, SnS$_2$, NiS, CuS, graphite, and amorphous carbons.

18. A method for manufacturing a battery, comprising
providing an anode and a cathode;
preparing an electrolyte from a salt, a water and a molecular crowding agent, wherein the molecular crowding agent is a water-miscible or water-soluble polymer selected from the group consisting of poly(ethylene glycol), poly(propylene glycol), polyethylenimine, poly(acrylic acid), polyvinylpyrrolidone, poly(vinyl alcohol), polyacrylamides, polyphosphates, polyphosphazenes, polyoxazoline, sodium carboxymethyl cellulose, hyaluronic acid, hydroxypropyl cellulose, divinyl ether-maleic anhydride, N-(2-hydroxypropyl) methacrylamide copolymer, and a derivative thereof, and wherein a weight ratio of the molecular crowding agent is from 65-98% based on the total weight of the molecular crowding agent and the water;

assembling the anode and the cathode with the electrolyte, thereby obtaining the battery.

\* \* \* \* \*